United States Patent
Matsumoto

(10) Patent No.: US 11,476,560 B2
(45) Date of Patent: Oct. 18, 2022

(54) COMMUNICATION SYSTEM

(71) Applicant: DENSO CORPORATION, Kariya (JP)

(72) Inventor: Sho Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 17/132,135

(22) Filed: Dec. 23, 2020

(65) Prior Publication Data

US 2021/0218131 A1 Jul. 15, 2021

(30) Foreign Application Priority Data

Jan. 15, 2020 (JP) .............................. JP2020-004345

(51) Int. Cl.
*H01Q 1/24* (2006.01)
*H04B 3/52* (2006.01)
*H01Q 13/24* (2006.01)
*H01P 3/16* (2006.01)
*H04B 3/54* (2006.01)

(52) U.S. Cl.
CPC ............... *H01Q 1/243* (2013.01); *H01P 3/16* (2013.01); *H01Q 13/24* (2013.01); *H04B 3/52* (2013.01); *H04B 3/54* (2013.01)

(58) Field of Classification Search
CPC .......... H01Q 1/243; H01Q 13/24; H01P 3/16; H04B 3/52; H04B 3/54
See application file for complete search history.

(56) References Cited

U.S. PATENT DOCUMENTS

2016/0087331 A1* 3/2016 Heppell .................. H01Q 1/52
343/702
2016/0254591 A1* 9/2016 Jung ..................... G06F 1/1626
343/702

FOREIGN PATENT DOCUMENTS

JP 2005-135762 A 5/2005
JP 2010-142083 A 6/2010
JP 2016-12954 A 1/2016

* cited by examiner

*Primary Examiner* — Andrea Lindgren Baltzell
(74) *Attorney, Agent, or Firm* — Posz Law Group, PLC

(57) ABSTRACT

A communication system disposed in a housing includes multiple communication devices each of which performing a wireless communication with one another. The communication devices include a specific communication device disposed on a mounting surface. The specific communication device includes at least one antenna structure, and the at least one antenna structure includes at least one antenna. The at least one antenna structure is disposed between the mounting surface and a predetermined wall surface of the housing. A gap between an outer shell of the at least one antenna structure and the predetermined wall surface of the housing is smaller than a wavelength of a radio wave used in the wireless communication of the communication devices. The at least one antenna of the specific communication device has a directivity in a direction parallel to the mounting surface.

10 Claims, 11 Drawing Sheets

US 11,476,560 B2

COMMUNICATION SYSTEM

CROSS REFERENCE TO RELATED APPLICATION

The present application claims the benefit of priority from Japanese Patent Application No. 2020-004345 filed on Jan. 15, 2020. The entire disclosure of the above application is incorporated herein by reference.

TECHNICAL FIELD

The present disclosure relates to a communication system disposed in a housing.

BACKGROUND

There has been known a communication system which includes multiple wireless communication devices disposed in a housing.

SUMMARY

A communication system disposed in a housing includes multiple communication devices each of which performing a wireless communication with one another. The communication devices include a specific communication device disposed on a mounting surface. The specific communication device includes at least one antenna structure, and the at least one antenna structure includes at least one antenna. The at least one antenna structure is disposed between the mounting surface and a predetermined wall surface of the housing. A gap between an outer shell of the at least one antenna structure and the predetermined wall surface of the housing is smaller than a wavelength of a radio wave used in the wireless communication of the communication devices. The at least one antenna of the specific communication device has a directivity in a direction parallel to the mounting surface.

BRIEF DESCRIPTION OF DRAWINGS

Objects, features and advantages of the present disclosure will become apparent from the following detailed description made with reference to the accompanying drawings. In the drawings.

DETAILED DESCRIPTION

The inventor of the present disclosure found out, based on a detailed study, a wireless communication in the housing may become difficult in a case where the housing of the communication system is downsized and a height of the housing is reduced. Due to the downsize and lowering of height, for example, a gap between an antenna opening surface of the communication device and a wall surface of the housing which faces the antenna opening surface is smaller than a wavelength of the radio wave used for the wireless communication, it becomes difficult to propagate the radio waves. The wireless communication mentioned here refers to a wireless communication between two or more communication devices disposed in the housing.

According to an aspect of the present disclosure, a communication system disposed in a housing includes multiple communication devices each of which performs a wireless communication with one another. The communication devices include a specific communication device disposed on a mounting surface. The specific communication device includes at least one antenna structure, and the at least one antenna structure includes at least one antenna. The at least one antenna structure is disposed between the mounting surface and a predetermined wall surface of the housing. The predetermined wall surface is one of wall surfaces of the housing. The at least one antenna structure has an outer shell. A gap between the outer shell of the at least one antenna structure and the predetermined wall surface of the housing is smaller than a wavelength of a radio wave used in the wireless communication of the communication devices. The at least one antenna of the specific communication device has a directivity in a direction parallel to the mounting surface.

According to the above configuration, in a case where the distance, that is the gap between the outer shell of the antenna structure included in the communication device and the predetermined wall surface of the housing is smaller than the wavelength of the radio waves used in the wireless communication inside the low-height housing, the radio waves propagate in the direction parallel to the mounting surface of the antenna structure. Thus, it is possible to suppress the difficulty of wireless communication in the housing.

The following will describe embodiments of the present disclosure with reference to the accompanying drawings. It should be noted that the term "parallel" described in the present disclosure is not limited to a strict parallel. Generally parallel which can provide similar effect is included in the parallel in the present disclosure. In the present disclosure, the term "perpendicular" should be interpreted in similar manner.

First Embodiment

Figure 1:
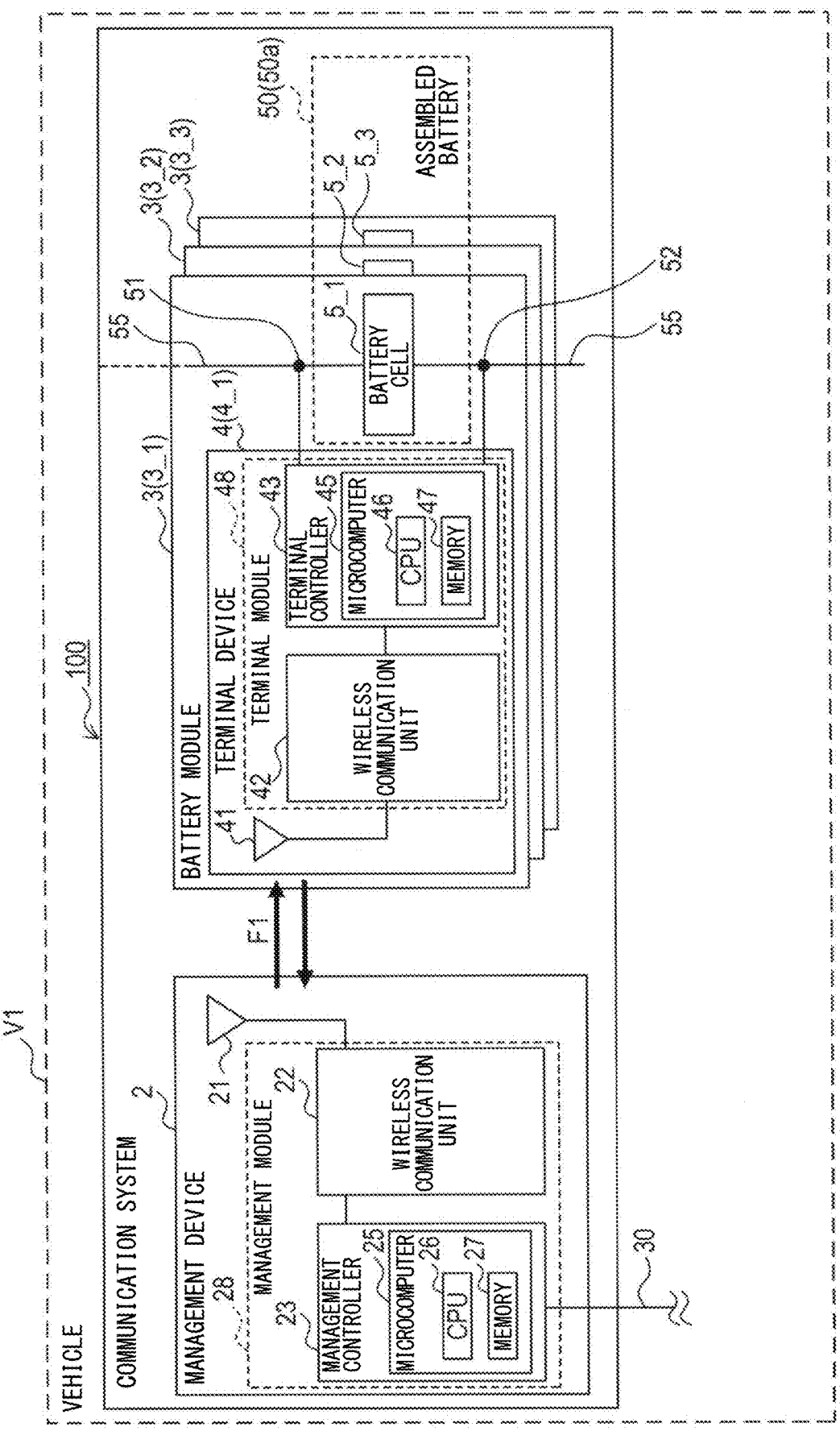
FIG. 1 is a block diagram showing a configuration of a communication system according to an embodiment of the present disclosure.

The following will describe a configuration of a communication system 100 according to the first embodiment of the present disclosure with reference to FIG. 1. The communication system 100 is mounted on a vehicle V1. The communication system 100 includes at least one management device 2 and multiple terminal devices 4. The terminal device 4 is different from the management device 2. The communication system 100 may include at least one assembled battery 50. The assembled battery 50 may include multiple battery cells 5 that are disposed in a package. Each battery cell 5 may be referred to as a battery unit.

In the present embodiment, the communication system 100 includes one management device 2 and three terminal devices 4. The communication system 100 further includes one assembled battery 50, and the assembled battery 50 includes three battery cells 5. It should be noted that the number of management devices 2 included in the communication system 100, the number of terminal devices 4 and the number of battery cells 5 are not limited to the examples described in the present embodiment.

Hereinafter, a module which includes one terminal device 4 and at least one battery cell 5 is referred to as a battery module 3. In the present embodiment, as shown in FIG. 1, an example in which the battery module 3 includes one terminal device 4 and one battery cell 5 will be described. It should be noted that the number of the battery cells 5 included in one battery module 3 is not limited to one. The number of battery cells 5 included in each battery modules 3 may be different from one another. In a case where the battery module 3 includes multiple battery cells 5, the battery cells 5 may be connected in series with one other. Alternatively, in a case where the battery module 3 includes multiple battery cells 5, the battery cells 5 may be connected in parallel with one other, or may be connected in combination of series connection and parallel connection.

In the following, each of the multiple components included in the communication system 100 may be represented by adding a suffix to a reference symbol, such as the terminal device 4_1 and the battery module 3_1. For the description of similar structure, the suffix may be omitted and only the reference symbol is described, such as the terminal device 4 and the battery module 3.

The following will describe a configuration of the management device 2. The management device 2 includes an antenna 21, a wireless communication unit 22, and a management controller 23. In the present embodiment, for example, the antenna 21 is configured as an omnidirectional planar antenna which have directivities in entire directions. The configuration of the antenna 21 is not limited to the above-described example.

The wireless communication unit 22 transmits and receives, via the antenna 21, wireless communication signals having a predetermined frequency band F1 used in the communication system 100 to and from the terminal device 4 included in each battery module 3. Hereinafter, the predetermined frequency band F1 used in the communication system 100 is also referred to as a use frequency band. The use frequency band F1 that is used in the communication system 100 may adopt the industry science and medical (ISM) band which has a frequency band of several gigahertz (GHz).

The management controller 23 includes a microcomputer 25. The microcomputer 25 includes a CPU 26, a ROM, a RAM, and a non-transitory semiconductor memory 27 such as a flash memory. Hereinafter, the semiconductor memory is also referred to as a memory. The management controller 23 executes various functions by the CPU 26 executing a program stored in the memory 27.

The management controller 23 may use the wireless communication unit 22 to perform the wireless communication with the terminal device 4, which is the target device. Specifically, the management controller 23 transmits a transmission instruction signal to the terminal device 4, controls the terminal device 4 to transmit battery information acquired by the terminal device 4, and stores the received battery information in the memory 27.

The battery information is information about the assembled battery 50, and may include various kinds of information about the assembled battery 50, such as a voltage of the assembled battery 50, a temperature of the assembled battery 50. The battery information may be information about the assembled battery 50 itself, or may include information about each battery cell 5 included in the assembled battery 50. In the present embodiment, the terminal device 4 acquires the voltage of the battery cell 5 included in the battery module 3 as the battery information, and transmits the battery information to the management device 2.

The management controller unit 23 may output the battery information stored in the memory 27 to an external device disposed out of the communication system 100 via a communication line 30. The external device may be an electronic control device included in the vehicle V1.

The following will describe a configuration of the terminal device 4. Each terminal device 4 has the same configuration with one another. Each terminal device 4 includes an antenna 41, a wireless communication unit 42, and a terminal controller 43.

In the present embodiment, the antenna 41 is configured as a horn antenna. The directivity of the antenna 41 will be described later. The configuration of the antenna 41 is not limited to the above-described example.

The wireless communication unit 42 transmits and receives a wireless communication signal to and from the management device 2 via the antenna 41. The wireless communication unit 42 of the terminal device 4 may be configured similarly to the wireless communication unit 22 of the management device 2.

The terminal controller 43 includes a microcomputer 45. The microcomputer 45 includes a CPU 46 and a memory 47. The terminal controller 43 executes various functions by the CPU 46 executing programs stored in the memory 47.

The terminal controller 43 may acquire the battery information at a predetermined cycle, and stores the acquired batter information it in the memory 47. The terminal controller 43 transmits the battery information to the management device 2 in response to the transmission instruction signal transmitted from the management device 2. In the present embodiment, the terminal controller 43 acquires the voltage of the battery cell 5 included in the battery module 3 of the terminal device 4 as the battery information, and transmits the acquired battery information to the management device 2 in response to the transmission instruction signal.

Figure 3:
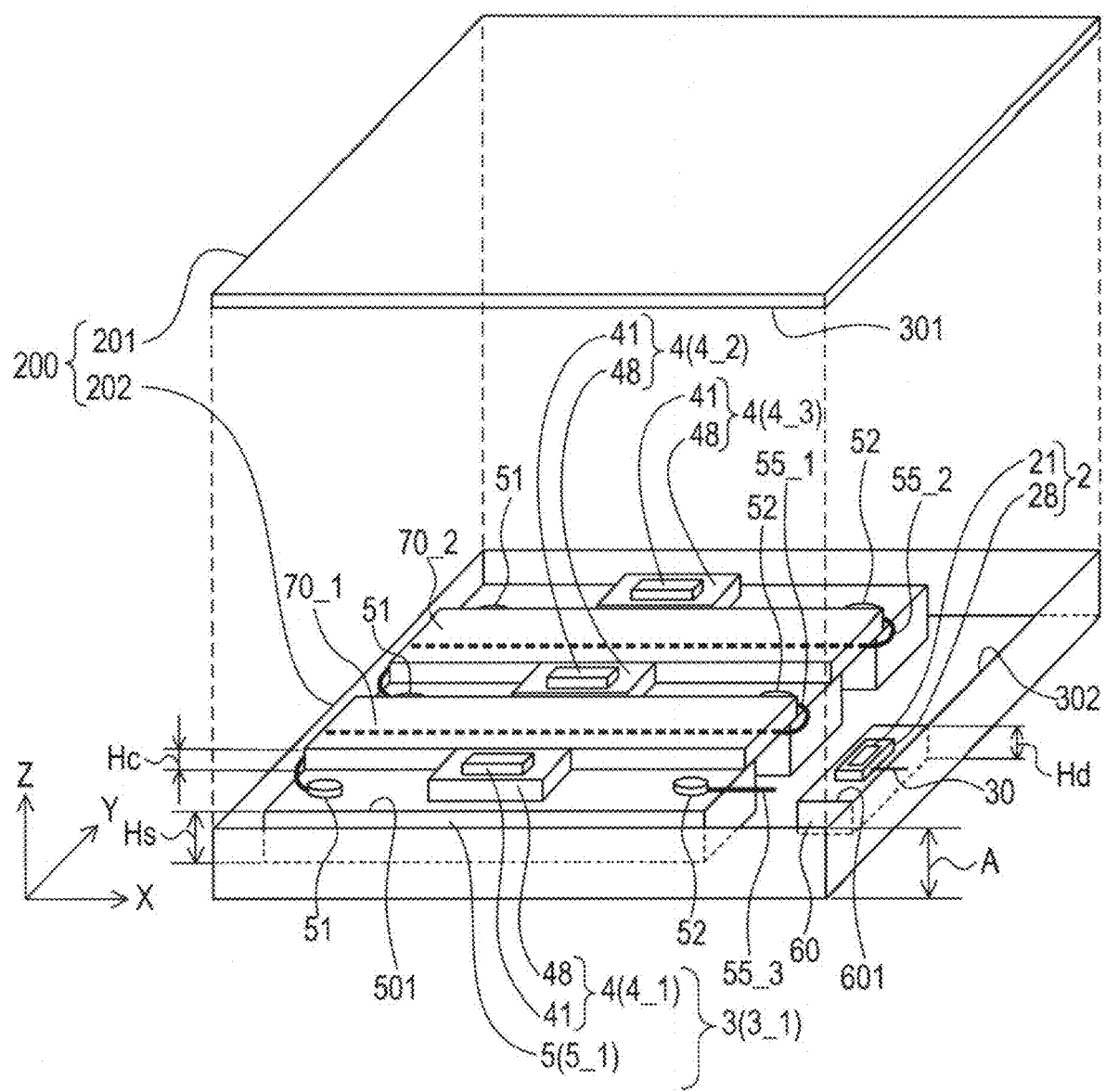
FIG. 3 is a diagram showing a perspective view of the housing and the communication system.

The following will describe a configuration of the assembled battery 50. The assembled battery 50 includes the three battery cells 5, that is, the battery cells 5_1 to 5_3. Each battery cell 5_1, 5_2, and 5_3 has the same shape with one another. The battery cell 5 may have a hexahedral shape as shown in FIG. 3. However, the shape of the battery cell 5 is not limited to the example shown in FIG. 3, and may have different shapes. A thickness Hs of the battery cell 5 in a predetermined direction is also referred to as a height of the battery 5. The battery cell 5 has a battery surface 501 on which two electrodes are disposed. The two electrodes include a first electrode 51 and a second electrode 52.

The electrodes 51 and 52 included in each battery cell 5 of the assembled battery 50 are connected with each other by a wiring 55. The wiring 55 connects the two electrodes 51 and 52 disposed on the battery surface 501 of each battery cell 5 so that the assembled battery 50 can be energized.

Figure 4:
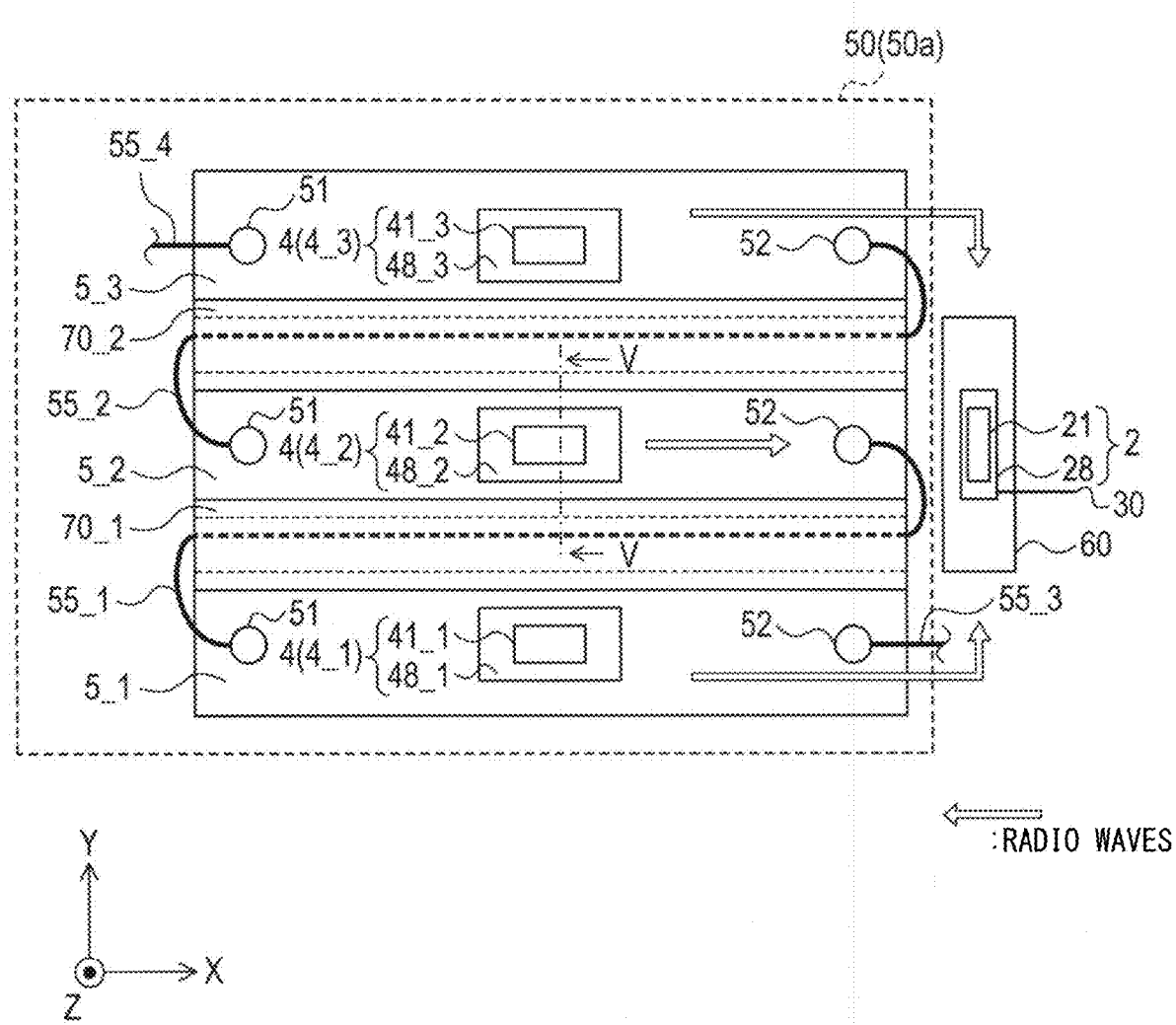
FIG. 4 is a diagram showing a plan view of the communication system.

For example, as shown in FIG. 4, the wiring 55_1 connects the electrode 51 of the battery cell 5_1 with the electrode 52 of the battery cell 5_2, and the wiring 55_2 connects the electrode 51 of the battery cell 5_2 with the electrode 52 of the battery cell 5_3. With this configuration, the battery cells 5_1 to 5_3 are connected in series so as to be energized as the assembled battery 50. The wiring 55_3 connected to the electrode 52 of the battery cell 5_1 and the wiring 55_4 connected to the electrode 51 of the battery cell 5_3 may extend toward outside of a housing 200, and be connected to a load.

Figure 2:
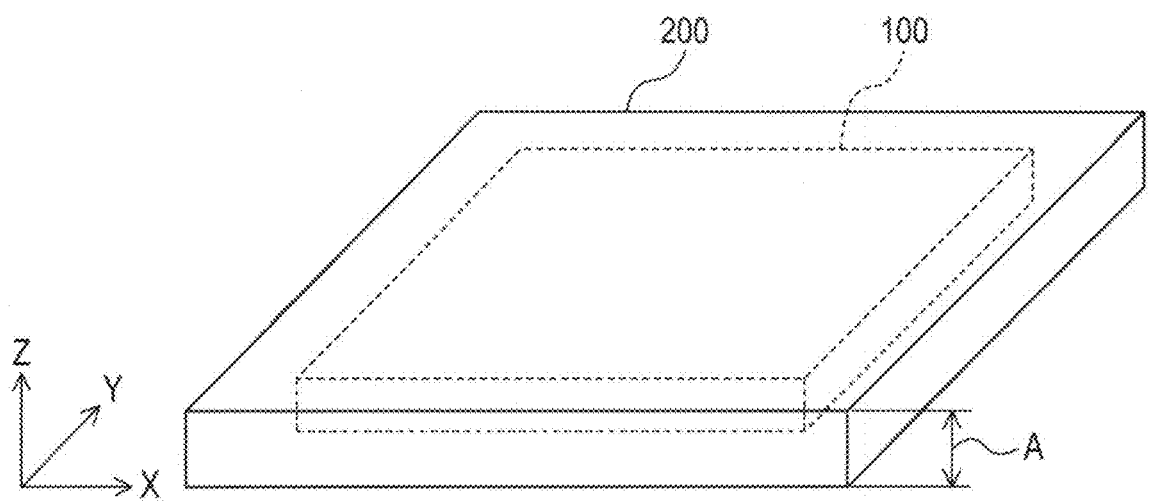
FIG. 2 is a diagram showing a perspective view of a housing in which the communication system is disposed.

The following will describe a configuration of the housing 200. As shown in FIG. 2, the communication system 100 may be disposed in a rectangular parallelepiped metal housing 200 disposed in the vehicle V1. As shown in FIG. 3, the housing 200 includes a lid portion 201 having a flat plate shape and a bottom portion 202 having a box shape. Hereinafter, x direction may be defined as a horizontal direction on a sheet surface of the drawing, y direction perpendicular to the x direction may be defined as a depth direction, and z direction perpendicular to the x direction and y direction may be defined as a vertical direction. An up to down direction on the sheet surface of the drawing corresponds to a height direction of the housing 200. An upward direction is defined as +z direction, and a downward direction is defined as −z direction. The above-mentioned battery surface 501 is one surface of the battery cell 5, and is defined as an upper surface of the battery cell 5 in the height direction. The thickness Hs of the battery cell 5 in the z direction is also referred to as the height of the battery 5.

The housing 200 has a compact size and low height. As shown in FIG. 3, the housing 200 has a lowered height A in +z direction, that is, a decreased thickness in +z direction.

The management device 2 is arranged along an inner peripheral wall surface 302, which is a surface of the housing 200 along an inner peripheral wall. In the present embodiment, a base 60 is arranged along the inner peripheral wall surface 302 of the housing 200. In the present embodiment, "along" may indicate an arrangement that is substantially parallel to. A management module 28 including the wireless communication unit 22 and the management controller 23 is arranged on an upper surface 601 of the base 60. The antenna 21, which is a planar antenna in the present embodiment, is arranged on the management module 28.

The antenna 21 is disposed between one of the wall surfaces of the housing 200 and the upper surface 601 of the base 60. More specifically, the antenna 21 is disposed between a lower surface 301 of the lid portion 201 of the housing 200 and the upper surface 601 of the base 60. Hereinafter, the lower surface 301 of the lid portion 201 of the housing 200 is referred to as a predetermined wall surface 301. The predetermined wall surface 301 referred to in the present embodiment is one of the wall surfaces of the housing 200, and specifically refers to the lower surface of the lid portion 201 of the housing. In the present embodiment, a height Hd of the base 60 is sufficiently lower than the height A of the housing 200. Although not shown, a gap between an outer shell of the antenna 21 and the predetermined wall surface 301 may be larger than a wavelength $\lambda$ of the radio wave having the use frequency band F1. However, the present disclosure is not limited to this configuration. The gap between the outer shell of the antenna 21 and the predetermined wall surface 301 may be smaller than the wavelength $\lambda$ of the radio wave having the use frequency band F1.

The terminal device 4 is disposed on the battery surface 501 of the battery cell 5. The battery cell 5 is included in the battery module 3 which includes the terminal device 4. Hereinafter, the battery surface 501 is also referred to as a mounting surface. The mounting surface indicates any surface on which the terminal device 4 is disposed. In the present embodiment, the mounting surface indicates the battery surface 501.

In the housing 200, the battery cells 5 are arranged along at least one of a first direction, that is, the x direction or a second direction, that is, the y direction. In the present embodiment, the first direction refers to the x direction, and is one of the directions parallel to the mounting surface, that is, the battery surface 501. In the present embodiment, the second direction refers to the y direction, and is one of the directions parallel to the mounting surface, that is, the battery surface 501. The second direction is perpendicular to the first direction. The directions parallel to the mounting surface may include the directions included in the mounting surface. In the present embodiment, the battery cells 5_1 to 5_3 are arranged along the y direction.

The wiring 55 is arranged to connect the two electrodes 51 and 52 disposed on the mounting surface, that is, the battery surface 501 of each battery cell 5 so that the assembled battery 50 can be energized. In the present embodiment, the wiring 55 extends in the x direction out of the x direction and the y direction, which are the directions in which the battery cells 5 can be arranged. The electrodes 51 and 52 are connected so that the battery cells 5 are connected in series. The x direction along which the wiring extends is a longitudinal direction of the battery cell 5.

As shown in FIG. 4, the wiring 55_1 extends in the x direction and is disposed between the battery cell 5_1 and the battery cell 5_2, and the wiring 55_2 extends in the x direction and is disposed between the battery cell 5_2 and the battery cell 5_3.

A cover 70 is disposed on the battery surface 501, that is, the mounting surface. The cover 70 protects the wiring 55 by covering the wiring 55. In the present embodiment, the cover 70 is made of metal. However, the material of cover 70 is not limited to metal. For example, resin may be used partially or entirely as material of the cover 70. In the present embodiment, the cover 70 has a straight linear shape. In FIG. 4, the cover 70 has a planar plate shape, but the cover 70 may have a shape other than the planar plate shape.

As described above, the wiring 55 extends linearly in the x direction. Thus, the cover 70 also extends linearly in the x direction in order to cover the wiring 55. As shown in FIG. 4, the cover 70_1 having a linear shape extends in the x direction and is arranged on the battery surface 501 of the battery cell 5_1 and the battery surface 501 of the battery cell 5_2 in order to cover the wiring 55_1. Similarly, the cover 70_2 having a linear shape extends in the x direction and is arranged on the battery surface 501 of the battery cell 5_2 and the battery surface 501 of the battery cell 5_3 in order to cover the wiring 55_2.

The cover 70 has a thickness Hc in the z direction, and the thickness in the z direction is also referred to as a height of the cover 70. In the present embodiment, as shown in FIG. 5, a gap Gc between an upper end of the cover 70 and the predetermined wall surface 301 of the housing is smaller than the wavelength $\lambda$ of the radio wave having the use frequency band F1.

Figure 5:
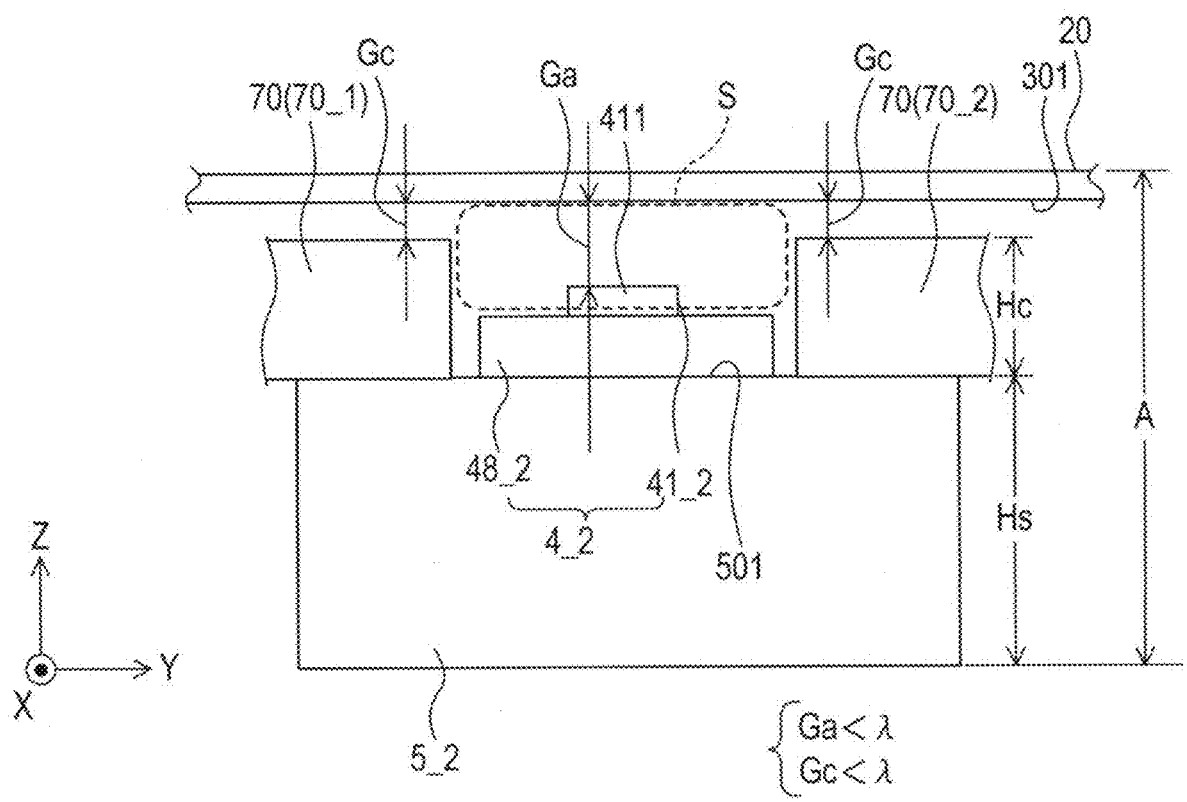
FIG. 5 is a cross-sectional view of the communication system taken along a line V-V in FIG. 4.

As shown in FIG. 5, for example, on the battery cell 5_2, two adjacent covers 70_1 and 70_2 disposed on the battery surface 501 of the battery cell 5_2 and the predetermined wall surface 301 of the housing 200 form a passage-like space S. The passage-like space S extends in the x direction, which is equal to the extending direction of the cover 70.

In the present embodiment, the terminal module 48 including the wireless communication unit 42 and the terminal controller 43 is arranged on the battery surface 501 of the battery cell 5 on which the cover 70 is disposed as described above. The antenna 41, which is a horn antenna, is arranged on the terminal module 48.

The antenna 41 is disposed between the predetermined wall surface 301 and the battery surface 501. In the present embodiment, the battery cell 5 has a predetermined height Hs, and the gap Ga between the outer shell of the antenna 41 and the predetermined wall surface 301 of the housing is smaller than the wavelength λ of the radio wave having the use frequency band F1.

Figure 6:
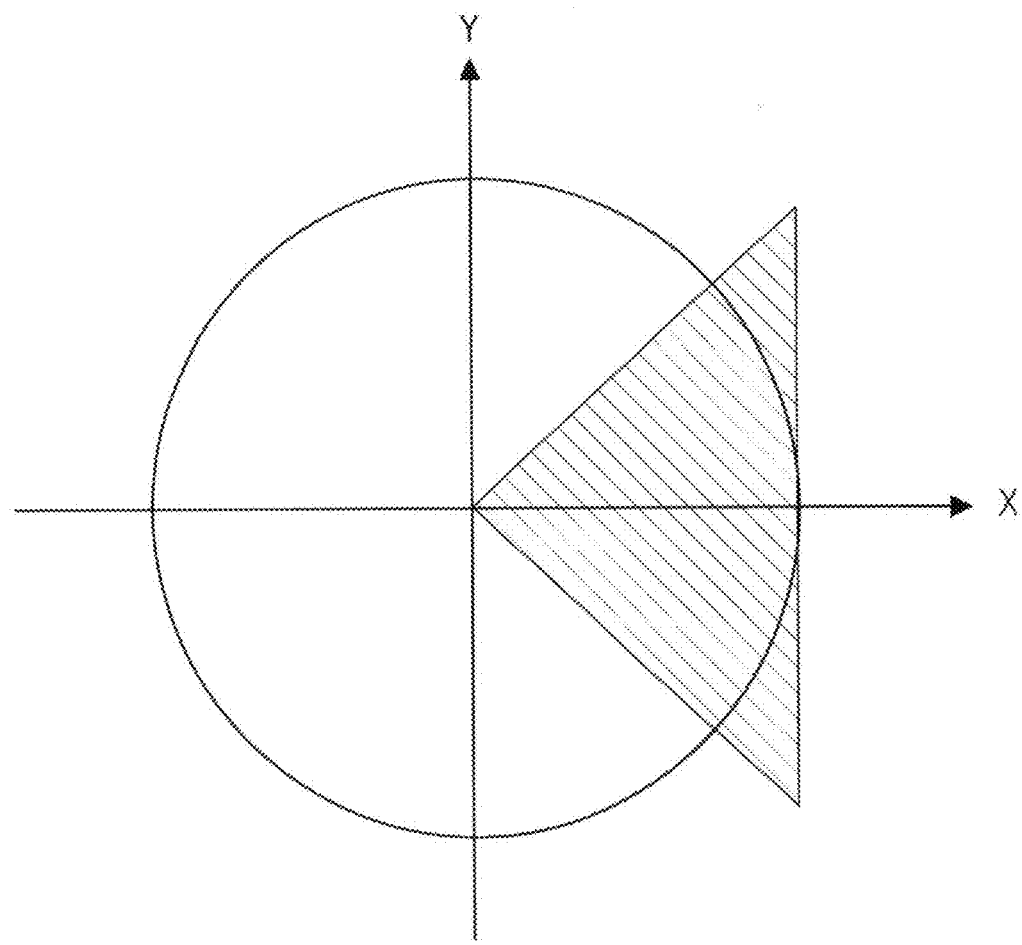
FIG. 6 is an explanatory diagram showing an example of directivity of an antenna included in a terminal device.

The antenna 41, which is a horn antenna, is arranged so that an opening surface 411 of the antenna 41 is perpendicular to the battery surface 501. The antenna 41 has a directivity in one of the directions in which the cover 70 extends parallel to the battery surface 501. Specifically, as shown in FIG. 6, the antenna 41 has the directivity in +x direction on x-y plane parallel to the battery surface 501. The +x direction is toward the management device 2 and the direction in which the cover 70 extends.

Figure 7:
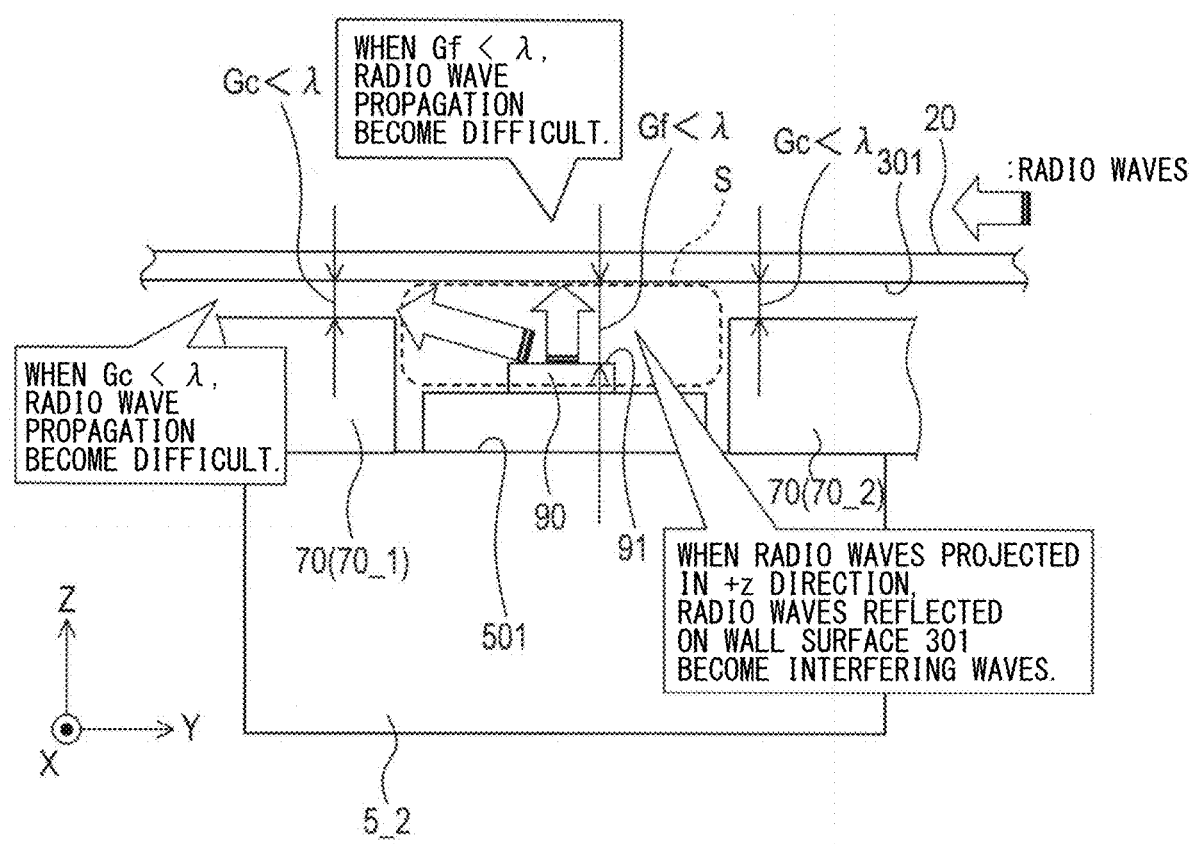
FIG. 7 is an explanatory diagram showing a propagation of radio waves by a comparison device disposed in the housing.

The following will describe the configuration of the communication system according to the present embodiment compared with a comparison example. As shown in the comparison example of FIG. 7, in a housing 200 having a low height, a wireless communication device 90 for comparison is disposed instead of the terminal device 4. The wireless communication device includes an antenna having an opening surface 91 perpendicular to the +z direction. Hereinafter, the wireless communication device 90 for comparison is also referred to as a comparison device 90. In the +z direction, the opening surface 91 of the antenna of the comparison device 90 is close to the predetermined wall surface 301, and the gap Gf between therebetween is smaller than the wavelength λ of the radio wave used in the wireless communication. As a result, it becomes difficult for radio waves to propagate in the +z direction, which is the direction in which the predetermined wall surface 301 is located. The difficulty in the wireless communication may be caused by the interference of the reflected waves on the predetermined wall surface 301.

Between the cover 70 and the predetermined wall surface 301, in the direction from the comparison device 90 toward the gap Gc, the upper end portion of the cover 70 is close to the predetermined wall surface 301, and a distance of the gap Gc is smaller than the wavelength λ of the radio wave. As a result, it becomes difficult for the radio waves to propagate in a direction of the gap Gc between the upper end portion of the cover 70 and the predetermined wall surface 301 due to a straightness of the radio waves.

In the present embodiment, as shown in FIG. 5, the terminal device 4 is close to the predetermined wall surface 301, and the gap Ga between the outer shell of the antenna 41 and the predetermined wall surface 301 is smaller than the wavelength λ of the radio wave having the use frequency band F1. In the present embodiment, the antenna 41 has the directivity in the +x direction. Therefore, as shown in FIG. 4, radio waves having the use frequency band F1 are likely to propagate in the directions shown by arrows. That is, the radio wave propagates in the +x direction using the above-mentioned space S shown in FIG. 5 as a propagation path. With this configuration, it is possible to prevent the wireless communication from becoming difficult between the terminal device 4 and the management device 2 disposed in the +x direction when viewed from the terminal device 4.

The present embodiment can provide the following effects.

The communication system 100 is disposed in the housing 200, and includes multiple communication devices that perform wireless communication with one another. Specifically, the communication system 100 includes one management device 2 and three terminal devices 4 as the communication devices. Hereinafter, a specific communication device refers to at least one of the communication devices disposed on the mounting surface, and the specific communication device includes at least one antenna structure. The antenna structure includes at least one antenna. The antenna structure may be a single antenna, or may include multiple antennas, or may include one or more antennas and other structures. Other structures may include, for example, connecting lines, micro-strip lines formed on a substrate, and the like.

The gap Ga between an outer shell of the antenna structure included in the specific communication device and the predetermined wall surface 301 is smaller than the wavelength of the radio wave used for the wireless communication, and the antenna has the directivity in a direction parallel to the mounting surface.

In the present embodiment, the terminal device 4 corresponds to the specific communication device, and the antenna 41 included in the terminal device 4 corresponds to the antenna structure. That is, the antenna 41 corresponds to at least one antenna included in the antenna structure. In the present embodiment, the antenna 41 has the directivity in a direction parallel to the mounting surface, that is, the battery surface 501.

With the above-described configuration, in the low-height housing 200, the gap Ga between the outer shell of the antenna 41 included in the terminal device 4 and the predetermined wall surface 301 is relatively small, and the wavelength λ of the radio wave having the use frequency band F1 is smaller than λ. Even in this configuration, the radio wave is able to propagate in the direction parallel to the battery surface 501, which is the mounting surface. That is, since the terminal device 4 is able to perform wireless communication in a direction parallel to the battery surface 501 on which the terminal device 4 is disposed, that is, the x direction described above, the height of the housing can be reduced. Thus, the difficulty of wireless communication in the housing 200 can be suppressed although the height of the housing is reduced.

In the communication system 100, the terminal device 4, which corresponds to the specific communication device, can perform the wireless communication even in the low-height housing 200. The terminal device 4 is configured to acquire and transmit the battery information. Thus, the management device 2 can receive the battery information from the terminal device 4 with a higher communication success probability. By disposing the terminal device 4 on the battery surface 501, the terminal device 4 can be stably mounted on the battery surface 501 when the battery surface 501 has a planar shape.

The battery cell 5 may be provided with multiple electrodes 51 and 52 disposed on the battery surface 501. The polarities of the electrode 51 and the electrode 52 are different from one another. The communication system 100 may include at least one wiring 55 and at least one cover 70 that covers the at least one wiring 55. The wiring 55 connects the multiple electrodes 51 and 52 disposed on the battery surface 501 so that the assembled battery 50 can be energized. At least one cover 70 which covers the wiring 55 is disposed on the battery surface 501. The antenna 41 included in the terminal device 4, which corresponds to the specific communication device, may have the directivity in the extending direction of the cover 70.

With the above-described configuration, the radio wave propagates in the direction along the cover 70. The direction along the cover 70 is a direction parallel to the longitudinal extending direction of the cover 70. The radio wave is more likely to be concentrated in the extending direction of the cover 70 than in the direction perpendicular to the extending direction of the cover 70. As a result, the wireless communication becomes easier due to the radio waves propagating in the extending direction of the cover 70.

The multiple battery cells 5 may be arranged along at least one of the first direction or the second direction. The first direction is one of the directions along the battery surface 501, which corresponds to the mounting surface. The second direction is another one of the directions along the battery surface 501, which corresponds to the mounting surface, and is perpendicular to the first direction. In the present embodiment, the x direction corresponds to the first direction, and the y direction corresponds to the second direction. The wiring 55 may extend in at least one of the first direction or the second direction. The cover 70 is configured to cover the wiring 55. Thus, the cover 70 extends in the first direction or in the second direction. In the present embodiment, the cover 70 extends in the x direction, which corresponds to the first direction.

The antenna 41 included in the terminal device 4, which corresponds to the specific communication device, may have the directivity in the extending direction of the cover 70. Specifically, the antenna 41 included in the terminal device 4 has the directivity in one of the directions along which the cover 70 extends, that is, the x direction in the present embodiment. The direction in which the terminal device 4 has the directivity is toward the management device 2, that is, the +x direction in the present embodiment. With this configuration, the terminal device 4, which corresponds to the specific communication device, can improve the communication success probability of wireless communication with the management device 2.

The management device 2 may be arranged along the inner peripheral wall surface 302 of the housing 200. This configuration facilitates the connection of the management device 2 with an electronic control device or the like disposed outside of the housing 200 via the communication line 30.

The terminal device 4, which corresponds to the specific communication device, may include the horn antenna as the antenna structure. The horn antenna may have the opening surface 411 perpendicular to the battery surface 501, which corresponds to the mounting surface. The horn antenna may have the directivity in the direction, that is, the +x direction parallel to the battery surface 501, which corresponds to the mounting surface. For example, when the horn antenna that has the strong directivity is used, the propagation of radio waves in the y direction along which the covers 70 are arranged within the narrow gap Gc becomes difficult. Thus, the propagation of the radio waves in the y direction is suppressed, and the radio waves are transmitted in the +x direction in a more concentrated manner. The +x direction is the direction in which the management device 2 is disposed when viewed from the terminal device 4. With this configuration, the terminal device 4, which corresponds to the specific communication device, can improve the communication success probability of wireless communication with the management device 2.

In the present embodiment, the management device 2 and three terminal devices 4 correspond to multiple communication devices, the management device 2 corresponds to at least one first communication device included in the multiple communication devices, and the terminal device 4 corresponds to multiple second communication devices included in the multiple communication devices. The first communication device is one of the communication devices of different types included in the communication system. The second communication device is a communication device different from the first communication device among the communication devices of different types included in the communication system. The terminal device 4 corresponds to the specific communication device. The antenna 41, which is provided by the horn antenna, corresponds to the antenna structure including at least one antenna, and is included in the specific communication device. In the present embodiment, the antenna structure corresponds to the antenna 41 itself. The antenna 41 corresponds to the antenna included in the specific communication device, and also corresponds to an antenna included in the second communication device functioning as the specific communication device.

The radio wave having the use frequency band F1 corresponds to the radio wave used in the wireless communication between or among the communication devices. Among the wall surfaces of the housing 200, the lower wall surface 301 of the lid portion 201 in the z direction corresponds to the predetermined wall surface 301. The battery surface 501 corresponds to the mounting surface. The x-direction and the y-direction correspond to the directions parallel to the mounting surface. The x direction corresponds to the first direction, and the y direction corresponds to the second direction. The x direction corresponds to at least one of the first direction or the second direction, and also corresponds to the extending direction of the cover 70. The +x direction corresponds to one of the extending directions of the cover 70.

Other Embodiments

Although an embodiment of the present disclosure has been described above, the present disclosure is not limited to the above-described embodiment, and it is possible to implement various modifications.

Figure 8:
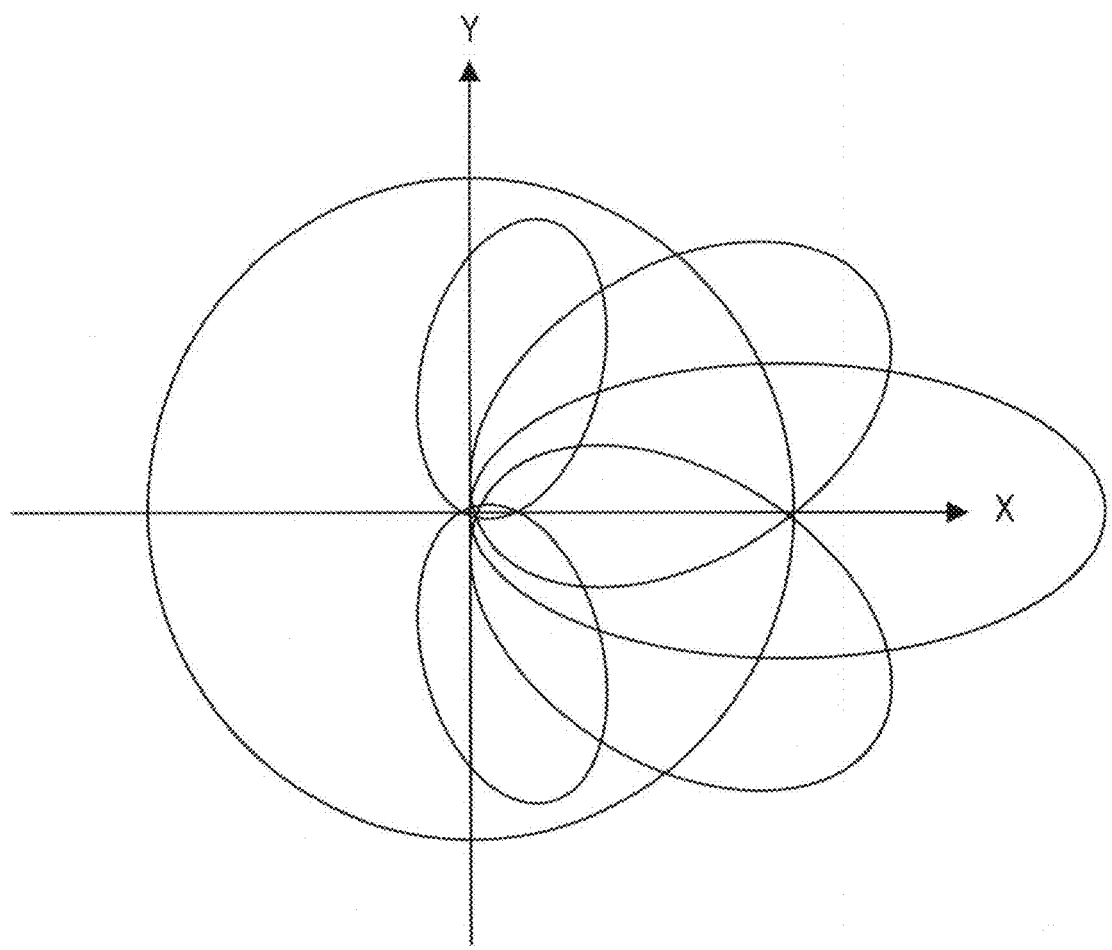
FIG. 8 is an explanatory diagram showing another example of directivity of the antenna included in the terminal device.

In the above-described embodiment, the antenna 41 is provided by the horn antenna, but the present disclosure is not limited to this configuration. For example, as shown in FIG. 8, the antenna 41 may be provided by a beam forming antenna having the directivity in the +x direction.

In the above-described embodiment, all of the terminal devices 4, that is, the terminal devices 4_1 to 4_3 included in the communication system 100 are configured as the specific communication devices. However, the present disclosure is not limited to this configuration. For example, at least one of the terminal devices 4 included in the communication system 100 may be configured as the specific communication device. As the specific communication device, the gap Ga between the outer shell of the antenna 41 and the predetermined wall surface 301 of the housing is smaller than the wavelength λ of the radio wave having the use frequency band F1, and the antenna provided in the specific communication device has the directivity in the direction parallel to the mounting surface.

Figure 9:
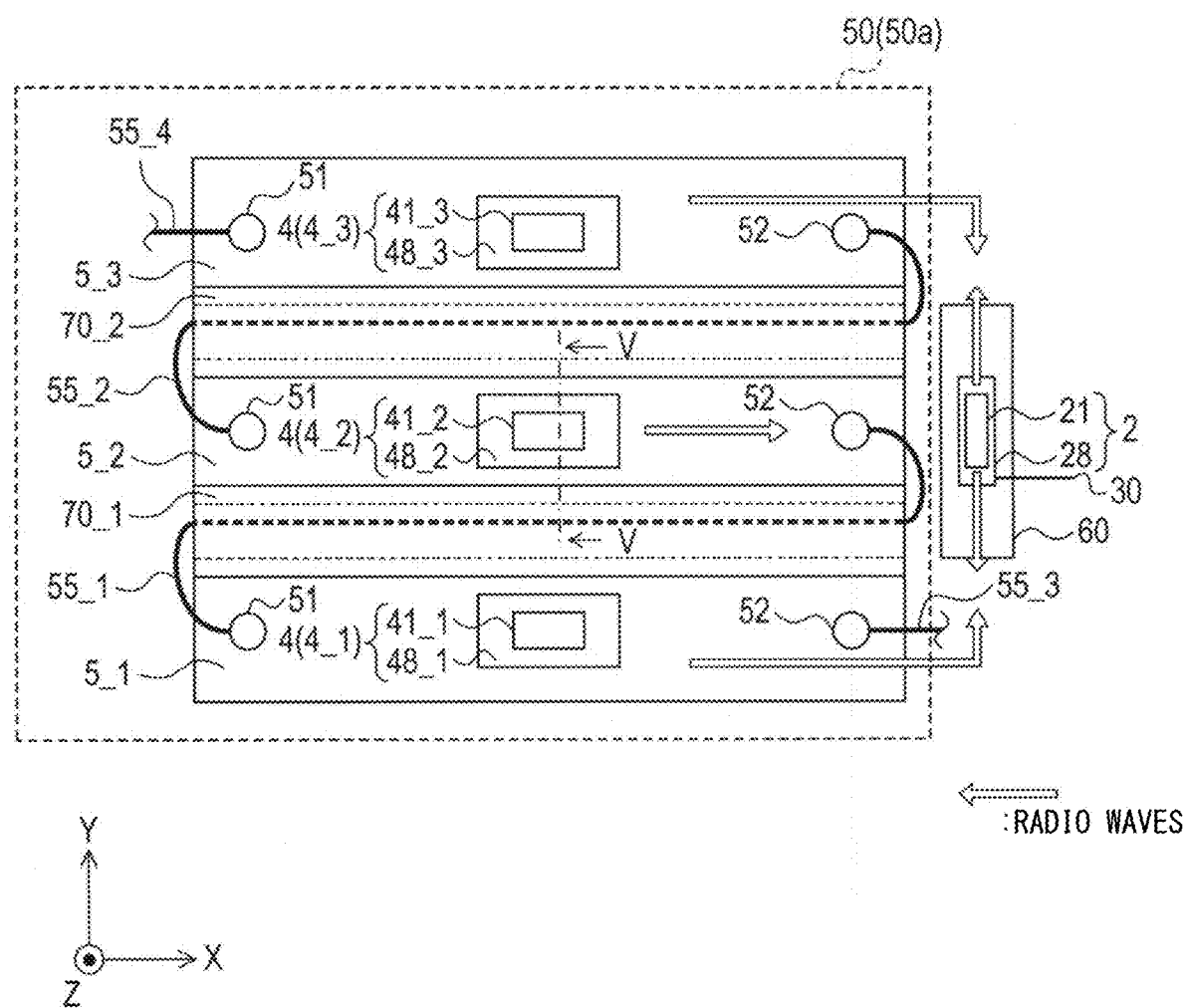
FIG. 9 is an explanatory diagram showing another embodiment of the present disclosure.

In the above-described embodiment, the antenna 21 is provided by the planar antenna having the directivity in all directions. However, the present disclosure is not limited to this configuration. For example, in the above-described embodiment, the management device 2 may be arranged so that the gap between the outer shell of the antenna 21 and the predetermined wall surface 301 is smaller than the wavelength λ of the radio wave having the use frequency band F1. As shown in FIG. 9, the antenna 21 may have the directivity within a predetermined directional range, such as a directional range including at least one of the +y direction or the −y direction in the direction (for example, the x direction or the y direction) parallel to the battery surface 501, which corresponds to the mounting surface. With this configuration, it is possible to improve the communication success probability of the wireless communication between the management device 2 and the terminal device 4 in the housing 200 having low height. In this case, in addition to the terminal device 4 described above, the management device 2 also corresponds to the specific communication device. The predetermined directional range corresponds to the directional including at least one of the +y direction or the −y direction.

Figure 10:
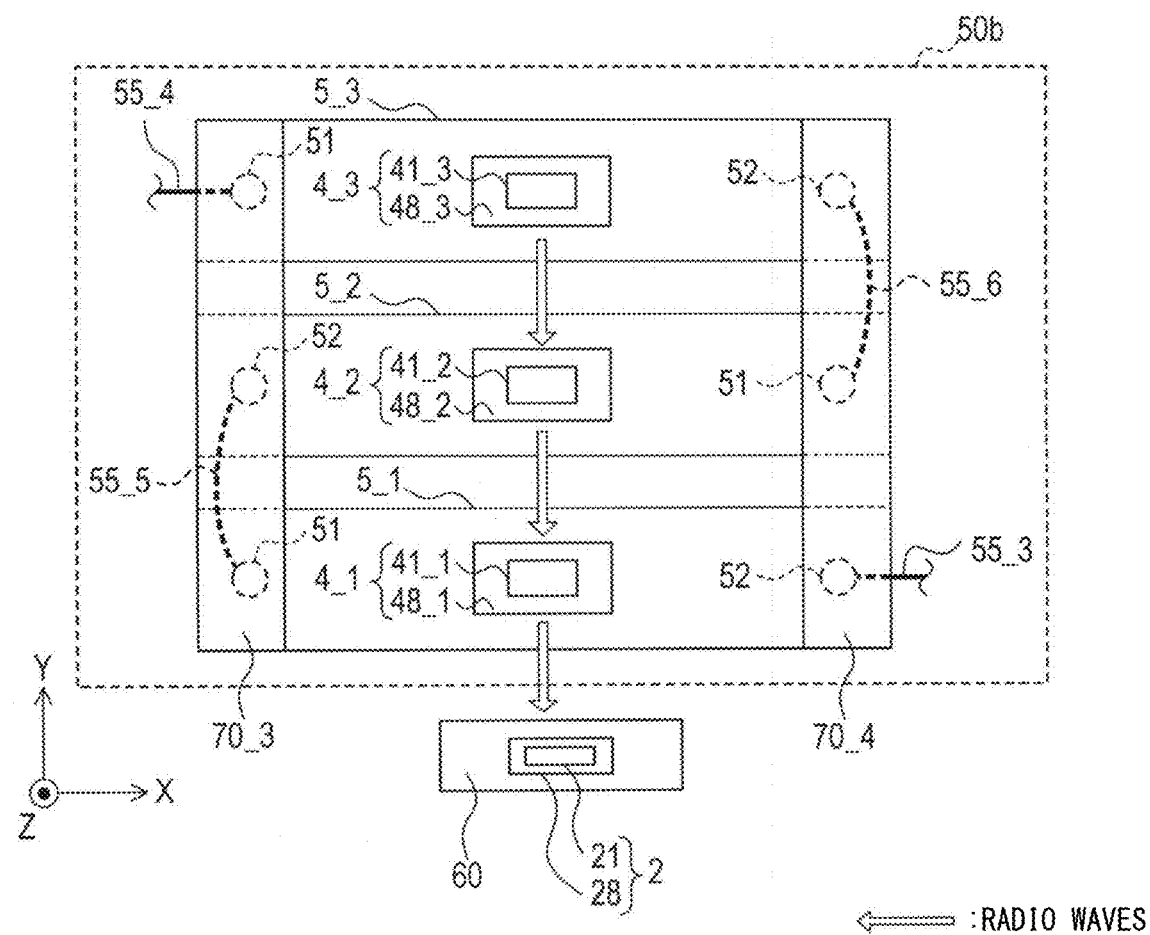
FIG. 10 is an explanatory diagram showing another embodiment of the present disclosure.

In the above-described embodiment, as shown in FIG. 4, the battery cells 5, that is, the battery cells 5_1 to 5_3 of the assembled battery 50, also referred to as the assembled battery 50*a*, are arranged along the y direction so that the electrodes 51 and 52 of the battery cells 5 have the same polarity directions. However, the present disclosure is not limited to this configuration. As shown in FIG. 10, the battery cells 5, that is, the battery cells 5_1 to 5_3 included in an assembled battery 50*b* may be arranged along the y direction so that the polarities of the electrodes 51, 52 of the battery cells 5 are alternately reversed.

The wiring 55_5 connects the electrode 51 of the battery cell 5_1 and the electrode 52 of the battery cell 5_2, which are arranged in the y direction. The wiring 55_6 connects the electrode 51 of the battery cell 5_2 and the electrode 52 of the battery cell 5_3, which are arranged in the y direction. The cover 70_3 covers the wiring 55_5, and the cover 70_4 covers the wiring 55_6. The covers 70_3 and 70_4 may extend in the y direction as shown in FIG. 10. The antenna 41 included in the terminal device 4, which corresponds to the specific communication device, may have the directivity in the −y direction, which is the extending direction of the cover 70 and is toward the management device 2.

Figure 11:
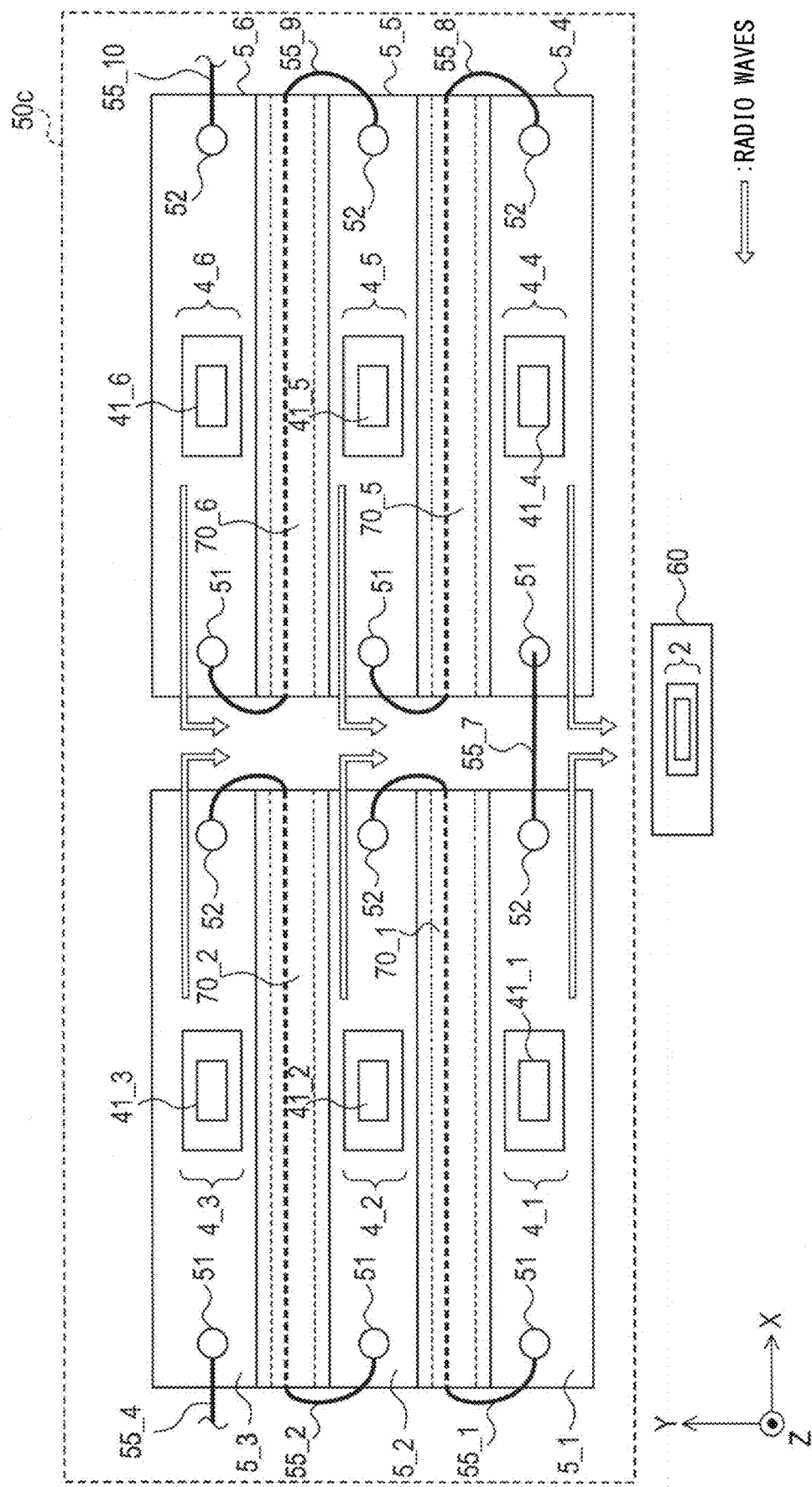
FIG. 11 is an explanatory diagram showing another embodiment of the present disclosure.

In the above-described embodiment, the battery cells 5 are arranged and arranged along the y direction. However, an arrangement of the battery cells 5 is not limited to this configuration. For example, as shown in FIG. 11, the battery cells 5 included in an assembled battery 50*c* may be arranged along both of the x direction and the y direction. As shown in FIG. 11, the assembled battery 50*c* includes battery cells 5_1 to 5_6. The battery cells 5_4 to 5_6 are arranged on the +x direction side of the battery cells 5_1 to 5_3. The battery cells 5_4 to 5_6 are arranged in the y direction, and the battery cells 5_1 to 5_3 are arranged in the y direction. The wirings 55_1 to 55_3 and 55_7 to 55_10 connect the battery cells 5_1 to 5_6 in series so as to be conductive. The wiring 55_10 extends toward outside of the housing 200, and is connected to a predetermined load. The wirings 55_1, 55_2, 55_8, and 55_9 extend in the x direction. That is, the covers 70_1, 70_2, 70_5, and 70_6 may be configured to extend in the x direction.

The antenna 41 included in the terminal device 41, that is, in each terminal device 4_1, 4_2, 4_3 as the specific communication device mounted on the corresponding battery cell 5_1, 5_2, 5_3 may have the directivity in the extending direction of the cover 70_1, 70_2 toward the management device 2, that is, in the +x direction. The antenna 41 included in the terminal device 41, that is, in each terminal device 4_4, 4_5, 4_6 as the specific communication device mounted on the corresponding battery cell 5_4, 5_5, 5_6 may have the directivity in the extending direction of the cover 70_5, 70_6 toward the management device 2, that is, in the −x direction.

In the above-described embodiment, the housing 200 is made of metal. However, material of the housing 200 is not limited to metal. For example, the housing 200 may be made of resin, may be made of metal and resin in combined manner, or may be made of material other than metal and resin. In the above-described embodiment, the housing 200 has a rectangular parallelepiped shape as shown in FIG. 2. However, the shape of the housing 200 is not limited to this configuration. For example, the housing 200 may have any shape other than the rectangular parallelepiped shape that allows the communication system 100 to be housed inside. The housing 200 does not necessarily have to be sealed.

The communication system 100 may include multiple management devices 2 and multiple terminal devices 4. For example, the terminal device 4 may include an antenna 41 having the directivity in the extending direction of the cover 70 parallel to the battery surface 501, which corresponds to the mounting surface, toward the management device 2. Similarly, the management device 2 may include an antenna 21 having the directivity in the extending direction of the cover 70 parallel to the battery surface 501, which corresponds to the mounting surface, toward the terminal device 4. In this configuration, each of the management device 2 and the terminal device 4 corresponds to the specific communication device, and each of the antenna 21 and the antenna 41 corresponds to the antenna structure and the antenna.

In the above-described embodiment, the cover 70 is configured to extend in either the x direction or the y direction. Alternatively, the cover 70 may be configured to extend in both of the x direction and the y direction. The antenna included in the antenna structure of the specific communication device may have the directivity in a direction along such-configured cover parallel to the battery surface 501, which corresponds to the mounting surface.

In the above-described embodiment, the wiring 55 has the linear shape, and the cover 70 covering the wiring 55 also has the linear shape. However, the present disclosure is not limited to this configuration. The wiring may have another shape, such as, a curved line or a polygonal line. Accordingly, the cover covering the wiring may have another shape corresponding to the shape of the wiring. The antenna included in the antenna structure of the specific communication device may have the directivity in a direction along such-configured cover parallel to the battery surface 501, which corresponds to the mounting surface.

In the above-described embodiment, the management device 2 is arranged along the inner peripheral wall surface 302 of the housing 200. However, the management device 2 may be arranged at any position in the housing 200.

In the above-described embodiment, an example has been described in which the surface below the lid portion 201, which is one of the wall surfaces of the housing 200, is designated as the predetermined wall surface 301. However, the predetermined wall surface may be any inner wall surface of the housing 200.

In the above-described embodiment, the example in which the battery surface 501 is used as the mounting surface has been described. However, the mounting surface may be any surface disposed in the housing 200 on which the communication devices such as the management device 2 and the terminal device 4 can be mounted.

The communication devices included in the communication system 100 may include a first communication device and a second communication device that communicate with each other. The first communication device may not be configured to receive battery information. The second communication device does not have to be configured to acquire the battery information and transmit it to the first communication device.

The multiple functions of one component in the above embodiment may be realized by multiple components, or a function of one component may be realized by the multiple components. In addition, multiple functions of multiple components may be realized by one component, or a single function realized by multiple components may be realized by one component. Moreover, the configuration of the above embodiment may be omitted in part. Further, at least part of the configuration of the above-described embodiment may be added to or replaced with the configuration of another embodiment described above.

What is claimed is:

1. A communication system disposed in a housing, the communication system comprising:
   a plurality of communication devices each of which performing a wireless communication with one another,
   wherein:
   the plurality of communication devices include a specific communication device disposed on a mounting surface;
   the specific communication device includes at least one antenna structure, and the at least one antenna structure includes at least one antenna;
   the at least one antenna structure is disposed between the mounting surface and a predetermined wall surface of the housing, and the predetermined wall surface is one of wall surfaces of the housing;
   the at least one antenna structure has an outer shell;
   a gap between the outer shell of the at least one antenna structure and the predetermined wall surface of the housing is smaller than a wavelength of a radio wave used in the wireless communication of the plurality of communication devices; and
   the at least one antenna of the specific communication device has a directivity in a direction parallel to the mounting surface.

2. The communication system according to claim 1, wherein:
   the plurality of communication devices include a first communication device and a plurality of second communication devices different from the first communication device;
   the first communication device is configured to receive battery information transmitted from the plurality of second communication devices; and
   each of the plurality of second communication devices is configured to acquire, as the battery information, information about an assembled battery including a plurality of battery cells, and transmit the acquired battery information to the first communication device.

3. The communication system according to claim 2, wherein
the specific communication device is the first communication device.

4. The communication system according to claim 3, wherein:
   the at least one antenna included in the first communication device, which corresponds to the specific communication device, has a directivity in a predetermined directional range; and
   the predetermined directional range is a range including the direction parallel to the mounting surface.

5. The communication system according to claim 2, wherein
the specific communication device is the second communication device.

6. The communication system according to claim 5, wherein:
   the second communication device, which corresponds to the specific communication device, is disposed on a battery surface; and
   the battery surface is a surface of the battery cell and corresponds to the mounting surface.

7. The communication system according to claim 6, further comprising
   at least one wiring; and
   a cover,
   wherein:
   each of the plurality of battery cells has a plurality of electrodes disposed on the battery surface;
   the at least one wiring connects the plurality of electrodes disposed on the battery surface so that the assembled battery becomes conductive;
   the cover is disposed on the battery surface and is configured to cover the at least one wiring; and
   the at least one antenna included in the second communication device, which corresponds to the specific communication device, has the directivity in an extending direction of the cover.

8. The communication system according to claim 7, wherein:
   the plurality of battery cells are arranged in at least one of a first direction or a second direction;
   the first direction is a direction along the battery surface, which corresponds to the mounting surface;
   the second direction is a direction perpendicular to the first direction;
   the wiring extends in at least one of the first direction or the second direction;
   the cover is configured to cover the wiring; and
   the at least one antenna included in the second communication device, which corresponds to the specific communication device, has the directivity in the extending direction of the cover.

9. The communication system according to claim 8, wherein
the at least one antenna included in the second communication device, which corresponds to the specific communication device, has the directivity in the extending direction of the cover toward one side.

10. The communication system according to claim 2, wherein
the first communication device is arranged along an inner peripheral wall surface of the housing.

* * * * *